(12) United States Patent
Nammi et al.

(10) Patent No.: US 9,602,181 B2
(45) Date of Patent: Mar. 21, 2017

(54) IMPLEMENTING CODEBOOK SUBSET RESTRICTIONS IN WIRELESS COMMUNICATION SYSTEMS

(71) Applicant: Telefonaktiebolaget L M Ericsson (publ), Stockholm (SE)

(72) Inventors: Sairamesh Nammi, Kista (SE); Bo Göransson, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 71 days.

(21) Appl. No.: 14/420,913

(22) PCT Filed: Aug. 13, 2013

(86) PCT No.: PCT/SE2013/050969
§ 371 (c)(1),
(2) Date: Feb. 11, 2015

(87) PCT Pub. No.: WO2014/027949
PCT Pub. Date: Feb. 20, 2014

(65) Prior Publication Data
US 2015/0207556 A1    Jul. 23, 2015

Related U.S. Application Data

(60) Provisional application No. 61/683,665, filed on Aug. 15, 2012, provisional application No. 61/796,023, filed on Nov. 1, 2012.

(51) Int. Cl.
*H04W 72/00* (2009.01)
*H04B 7/04* (2017.01)
(Continued)

(52) U.S. Cl.
CPC ......... *H04B 7/0478* (2013.01); *H04B 7/0413* (2013.01); *H04B 7/0456* (2013.01);
(Continued)

(58) Field of Classification Search
CPC combination set(s) only.
See application file for complete search history.

(56) References Cited

U.S. PATENT DOCUMENTS 8,537,879 B2 * 9/2013 Vitthaladevuni ..... H04L 1/0001
375/146
8,724,543 B2 * 5/2014 Jongren ............... H04B 7/0632
370/328
(Continued)

FOREIGN PATENT DOCUMENTS

EP       2437408 A1    4/2012
WO    2009025619 A2    2/2009
(Continued)

OTHER PUBLICATIONS

Samsung, Codebook subset restriction for 8-Tx codebook, 3GPP TSG RAN WG1 #63, 5 pages, Nov. 2010.*
(Continued)

*Primary Examiner* — Frank Duong
(74) *Attorney, Agent, or Firm* — Patent Portfolio Builders, PLLC (57) ABSTRACT

In MU-MIMO scenarios, a transmitting node (700) receives feedback on a feedback channel from a receiving node (1200) regarding a channel between the transmitting and receiving nodes (700, 1200). The feedback also includes preferences of the receiving node (1200). However, the feedback may not always be useful. For example, the receiving node (1200) may indicate a preferred rank in the feedback that the transmitting node (700) cannot accommodate. To address such issues, mechanisms for the transmitting node (700) to convey its preferences to the receiving node (1200) are proposed. The receiving node (1200), with such knowledge, can provide more useful feedback information to the transmitting node (700).

26 Claims, 5 Drawing Sheets

(51) Int. Cl.
*H04B 7/06* (2006.01)
*H04W 72/04* (2009.01)

(52) U.S. Cl.
CPC ......... *H04B 7/0486* (2013.01); *H04B 7/0619* (2013.01); *H04B 7/0634* (2013.01); *H04B 7/0645* (2013.01); *H04B 7/0658* (2013.01); *H04B 7/0697* (2013.01); *H04W 72/042* (2013.01); *H04W 72/0406* (2013.01); *H04W 72/0453* (2013.01)

(56) References Cited

U.S. PATENT DOCUMENTS

| | | | | |
|---|---|---|---|---|
| 8,913,674 | B2* | 12/2014 | Han | H04B 7/0413 375/260 |
| 9,136,924 | B2* | 9/2015 | Park | H04B 7/0413 |
| 2011/0243098 | A1* | 10/2011 | Koivisto | H04B 7/0482 370/335 |
| 2013/0163687 | A1* | 6/2013 | Jing | H04B 7/0658 375/267 |
| 2014/0016549 | A1* | 1/2014 | Novlan | H04B 7/0417 370/328 |
| 2014/0169493 | A1* | 6/2014 | Hammarwall | H04B 7/0634 375/267 |

FOREIGN PATENT DOCUMENTS

| | | |
|---|---|---|
| WO | 2011060299 A2 | 5/2011 |
| WO | 2012005476 A2 | 1/2012 |
| WO | 2012090851 A1 | 7/2012 |

OTHER PUBLICATIONS

Alcatel-Lucent, Codebook Subset Restriction for Transmission Mode 9, 3GPP TSG RAN WG1 Meeting #63, 2 pages, Nov. 2010.*
Unknown, Author, "4-branch MIMO for HSDPA", Ericsson, 3GPP TSG RAN WG1 Meeting #65, R1-111763, Barcelona, Spain, May 9-13, 2011, 1-17.
Unknown, Author, "Codebook Subset Restriction in Four Branch MIMO System", Ericsson, 3GPP TSG•RAN WG1 #70bis, R1-124503, San Diego, CA, USA, Oct. 8-12, 2012, 1-5.
Unknown, Author, "Precoding Codebook Design for Four branch MIMO System", 3GPP TSG-RAN WG1 #68bis, R1-121761, Ericsson, Jeju, South Korea, Mar. 26-30, 2012, 1-14.
Office Action in EP application No. 13879598.4 mailed Sep. 11, 2015.
Office Action in AU application No. 2013303263 issued Jul. 10, 2015.

* cited by examiner

| CCS<br>(7 bits) | MOD<br>(5 bits) | RI<br>(2 bits) | Codebook Subset<br>(16 bits) |
|---|---|---|---|

IMPLEMENTING CODEBOOK SUBSET RESTRICTIONS IN WIRELESS COMMUNICATION SYSTEMS

RELATED APPLICATION

This application claims priority and benefit of U.S. application 61/683,665 entitled "IMPLEMENTING CODEBOOK SUBSET RESTRICTIONS IN HIGH SPEED DOWNLINK PACKET ACCESS SYSTEMS" filed on Aug. 15, 2012, which is incorporated herein by reference in its entirety.

TECHNICAL FIELD

The technical field of the present disclosure generally relates to wireless communication networks including methods, apparatuses, and/or systems for channel quality reporting, and in particular to high performance networks such as HSDPA (high speed downlink packet access) networks for implementing codebook subset restrictions.

BACKGROUND

Several new features are added for the long term HSPA (high speed packet access) evolution in order to meet the requirements set by the IMT-A (International Mobile Telecommunications Advanced). The main objective of these new features is to increase the average spectral efficiency.

One possible technique for improving downlink spectral efficiency would be to introduce support for multiple antennas employed at the transmitter and the receiver. For example, a four branch MIMO (multiple input multiple output) can utilize up to four Tx (transmit) and Rx (receive) antennas to enhance the SM (spatial multiplexing) gains and to offer improved beam forming capabilities. Four branch MIMO provides up to 84 Mbps per 5 MHz carrier for high SNR (signal-to-noise ratio) users and improves coverage for low SNR users.

The current HSDPA system (Release 7-10) supports one or two transmit antennas at the Node B. In these systems, from channel sounding, the UE (user equipment) measures the channel and reports the CSI (channel state information) in one sub frame to the Node B as feedback. Typically, the CSI report includes a CQI (channel quality indicator) which explicitly indicates a preferred rank and a PCI (precoding control index). The UE sends this report periodically for every subframe or TTI (transmit time interval) as feedback. Once the Node B receives this report, it grants modulation and coding, number of codes, rank and the precoding channel indicator to each specific UE based on a scheduler metric.

Currently, a 4-Tx transmission scheme for HSDPA is being discussed within the 3GPP ($3^{rd}$ Generation Partnership Project) standardization process. One issue the 3GPP has discussed extensively is on the design of the precoding codebook. It was decided to use codebook with 16 elements for each rank.

SUMMARY

A non-limiting aspect of the disclosed subject matter may be directed to a method performed at a transmitting node of a wireless network to provide transmission control information to a receiving node. The transmission control information may specify one or more transmission characteristics that will be applied by the transmitting node in transmitting data to the receiving node. The method performed by the transmitting node may include providing feedback restriction information to the receiving node. The feedback restriction information may specify restrictions on a feedback report to be sent from the receiving node. The feedback restriction information may be provided over a control channel, and the control channel may be a physical layer control channel. The method may also include receiving the feedback report from the receiving node. The feedback report may include one or more feedback parameters. Each feedback parameter may indicate a channel characteristic of a wireless channel between the transmitting node and the receiving node, or may indicate a transmission characteristic preferred by the receiving node of data transmission from the transmitting node to the receiving node. The method may further include providing the transmission control information to the receiving node based on the feedback parameters.

A non-limiting aspect of the disclosed subject matter may be directed to a computer-readable medium that includes therein programming instructions. When a computer executes the programming instructions, the computer may execute the method performed by a transmitting node of a wireless network to provide transmission control information as described above.

A non-limiting aspect of the disclosed subject matter may be directed to a transmitting node of a wireless network. The transmitting node may be structured to provide transmission control information to a receiving node. The transmitting node may include a feedback manager and a transmission manager. The feedback manager may be structured to provide feedback restriction information to the receiving node. The feedback restriction information may be provided over a control channel, which may be a physical layer control channel. The feedback manager may also be structured to receive the feedback report from the receiving node. The transmission manager may be structured to provide the transmission control information to the receiving node based on the feedback parameters.

A non-limiting aspect of the disclosed subject matter may be directed to a method performed at a receiving node of a wireless network to provide a feedback report to a transmitting node. The feedback report may include one or more feedback parameters. The method performed by the receiving node may include receiving feedback restriction information from the transmitting node. The feedback restriction information may be received over a control channel, which may be a physical layer control channel. The method may also include estimating a channel state of a communication channel between the transmitting node and the receiving node based on a reference signal transmitted from the transmitting node. The method may further include providing the feedback report to the transmitting node based on the estimated channel state and the feedback restriction information. Preferably, the feedback report complies with the restrictions specified in the feedback restriction information. The method may yet further include receiving transmission control information from the transmitting node.

Another non-limiting aspect of the disclosed subject matter may be directed to a computer-readable medium that includes therein programming instructions. When a computer executes the programming instructions, the computer may execute the method performed by a receiving node of a wireless network to provide feedback to a transmitting node as described above.

Another non-limiting aspect of the disclosed subject matter may be directed to a receiving node of a wireless network structured to provide a feedback report to a transmitting node. The transmitting node may include a channel estimator, a feedback manager and a reception manager. The channel estimator may be structured to estimate a channel state of a communication channel between the transmitting node and the receiving node based on a reference signal transmitted from the transmitting node. The feedback manager may be structured to receive feedback restriction information from the transmitting node. The feedback restriction information may be received over a control channel, which may be a physical layer control channel. The feedback manager may also be structured to provide the feedback report to the transmitting node based on the estimated channel state and the feedback restriction information. The reception manager may be structured to receive transmission control information from the transmitting node.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor or "DSP" hardware, read only memory or "ROM" for storing software, random access memory or RAM, and non-volatile storage.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1xEVDO, Wireless LAN, WiFi, etc. Thus, the scope of this disclosure is not limited to the set of 3GPP wireless network systems and can encompass many domains of wireless communication systems. Also, a wireless terminal will be used as an example of a receiver in which the described method can be performed. Examples of the wireless terminal include UE, laptop, PDA, smart phone, mobile terminal, etc. That is, the descriptions generally will focus on the downlink transmissions. However, the subject matter is equally applicable to uplink transmissions. That is, the disclosed subject matter is applicable to any node of the network including base stations—e.g., RBS, Node B, eNode B, eNB, etc.—and relay stations that receive wireless signals.

As mentioned above, MIMO may be utilized to improve downlink spectral efficiency. For example, in a four branch MIMO, four Tx and Rx antennas can be used to enhance the spatial multiplexing gains and to offer improved beam forming capabilities. Also as indicated, current HSDPA systems support one or two transmit antennas at the Node B. For these systems, from channel sounding, the UE measures the channel and reports the CSI in one sub frame to the Node B as feedback. Typically this report includes CQI and PCI, and the UE sends this report periodically for every subframe or TTI as feedback. Recall that CQI can indicate rank.

In general, the Node B has no control in the selection of the rank, the precoding control, and/or the channel quality reported by the UE. This can be problematic in that in some instances, the UE feedback information is not useful for the Node B. For example, the Node B may not have power and/or codes to schedule the UE with the desired rank information.

In other instances, the Node B may have the capability to schedule the UEs with certain precoder elements. However, no mechanism currently exists through which the Node B can notify the UE with information such as what rank information it prefers, what precoder elements it does not prefer, and so on.

To address at least the above mentioned problems, one or more methods, apparatuses and/or systems are described herein in which a network node such as the Node B can indicate and/or control the composition of the feedback information reported back from the UE.

To put things into context, an overview of a codebook based MIMO precoding is provided. Ideal linear precoding requires full CSI at the transmitter such as Node B. This may be possible for TDD (time division duplex) based systems, but is not practical for FDD (frequency division duplex) based systems. Codebook based precoding allows the receiver, e.g., the UE, to explicitly identify a precoding matrix or vector based on a codebook that should be used for transmission.

In 3GPP's LTE (Long Term Evolution)/HSDPA standard, separate codebooks are defined for various combinations of the number of transmit antennas and the number of transmission layers. The latter is also referred to as RI (rank information). For example, for four transmit antennas, a total 64 precoding vectors and matrices are defined. Also in the codebook for the scenarios of RI=1, 2, 3, 4, sixteen (16) elements per rank are defined. The 3GPP standard does not specify the criteria the UE should use to compute the RI and/or the optimum precoding matrices/vectors.

Figure 1:
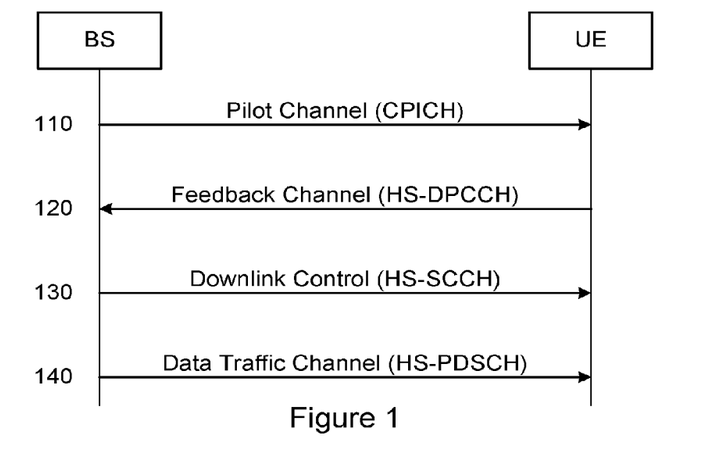
FIG. 1 illustrates an example of messages exchanged between a base station and a wireless terminal during a typical call setup.

FIG. 1 illustrates an example of messages exchanged between a BS (base station), e.g., Node B, and a wireless terminal (e.g., UE), during a typical call set up. The Node B transmits pilot symbols, also referred to as sounding, on a CPICH (common pilot channel) at 110. From the pilot symbols, the UE estimates the channel between it and the Node B and computes the CQI and the PCI. For the four branch MIMO, the UE informs as feedback the following to the Node B through the (high speed downlink physical control channel) at 120: HARQ (hybrid automatic repeat request) ACK/NAK, CQI, RI, and PCI. The RI indicates the number of layers that the UE prefers. In this context, rank, streams, transport block, and layers can be viewed as being synonymous with each other. Thus, the RI can also be understood as indicating the preferred rank.

Once the feedback information is received from the UE, the Node B decides on the rank, modulation and coding, transport block size, and the PCI for data traffic to the UE. The Node B provides this transmission control information to the UE on HS-SCCH (high speed shared control channel) at 130. After providing the transmission control information, the Node B then transmits DL (downlink) data to the UE on HS-PDSCH (high speed downlink shared channel) at 140.

In one or more aspects, a transmitting node (node that transmits data) may control, i.e., specify a feedback provided from a receiving node (node that receives data). Note that a node can perform the roles of both the transmitting and the receiving node. The categorization simply reflects the direction of data transmission between any two nodes. For example, in the downlink, a base station (e.g., Node B, eNode B, eNB, relay station, micro/femto/pico BS, etc.) may be the transmitting node and a wireless terminal (UE, tablet, PDA, cell phone, etc.) may be the receiving node. In the uplink, the roles can be reversed. The following are some of the non-limiting ways that the transmitting node may control or specify the feedback report sent from the receiving node:

Using higher order signaling (above the physical layer);
Using control channels (e.g., HS-SCCH); and
Using orders.

For explanation purposes, a DL transmission scenario involving a Node B as the transmitting node and a UE as the receiving node will be described. This is not to be taken as a limitation. Rather, the disclosed concepts should be readily applicable to scenarios in which there are communications between nodes.

In an aspect, the UE can be restricted report PCI and RI within a subset of the precoder codebook. The restriction can be configured through a higher layer signaling, e.g., layer 3. As an illustration, the restriction can be specified in a bitmap parameter codebookSubsetRestriction configured through RRC (radio resource control) layer signaling. This information can be sent through the RRC signaling during a cell setup. In this instance, the Node B may use the same codebookSubsetRestriction for all UEs it serves at a given moment.

For a specific precoder codebook and associated transmission mode, a bitmap can specify all possible precoder codebook subsets from which the UE can assume the Node B may be using when the UE is configured. For a 4-Tx antenna system, the precoding codebook (or simply "codebook") can contain a total of 64 elements (16 elements per rank). In this instance, the bitmap can include a bit sequence $a_{63}, \ldots, a_3, a_2, a_1, a_0$ in which $a_{63}$ and $a_0$ are assumed to respectively represent the MSB (most significant bit) and LSB (least significant bit). A bit value of zero (or one) can be used to indicate that the feedback reporting (e.g., RI/PCI reporting) is prohibited for precoder(s) associated with the bit.

It is also possible that the bitmap can specify a subset less than all possible codebook elements. As will be detailed further below, the bit sequence can include a bitmap field with a length less than 64 bits.

Figure 2:
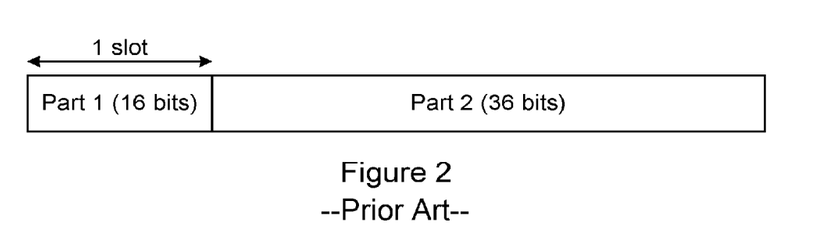
FIG. 2 illustrates a structure of a conventional control channel.

FIG. 2 illustrates a conventional HS-SCCH structure for a four branch MIMO system. As seen, the existing HS-SCCH structure, which has 52 bits, is divided into two parts:

Part 1 carries information related to the channelization code set, precoding weight information, modulation scheme and number of preferred transport blocks;

Part 2 carries information on transport block size, HARQ process, and redundancy and constellation version.

For the four branch MIMO, Part 1 is used to provide information about the channelization code set (7 bits), modulation information (5 bits), and PCI (4 bits). Hence a total 16 bits is necessary to provide the complete information in Part 1. The rank information is implicitly informed through the modulation information bits. The UE identity is also signaled in Part 1 through a UE-specific mask applied to the Part I encoded sequence.

Part 2 consists of 36 bits. Some of the bits are used to provide information about the transport block (6 bits), HARQ process (4 bits), redundancy version for the two streams (4 bits), and the UE ID (16 bits). For a single stream transmission, only 28 bits are necessary in Part 2.

To allow the UE sufficient time to decode the Part 1 message and to configure its receiver for receiving the data traffic on the HS-PDSCH, the Node B transmits the control information on the HS-SCCH two slots in advance of the associated HS-PDSCH subframe.

Table 1 illustrates an existing structure of Part 1 for indicating the modulation scheme. As noted above, five bits are used. Also as noted above and as seen in Table 1, the rank information is implicit.

TABLE 1

Part 1 combinations for modulation and rank (conventional)

| Bit pattern | RI | Modulation I | Modulation II | Modulation III | Modulation IV |
|---|---|---|---|---|---|
| 00000 | 1 | QPSK | NA | NA | NA |
| 00001 | 1 | 16 QAM | NA | NA | NA |

TABLE 1-continued

Part 1 combinations for modulation and rank (conventional)

| Bit pattern | RI | Modulation I | Modulation II | Modulation III | Modulation IV |
|---|---|---|---|---|---|
| 00010 | 1 | 64 QAM | NA | NA | NA |
| 00011 | 2 | QPSK | QPSK | NA | NA |
| 00100 | 2 | QPSK | 16 QAM | NA | NA |
| 00101 | 2 | QPSK | 64 QAM | NA | NA |
| 00110 | 2 | 16 QAM | QPSK | NA | NA |
| 00111 | 2 | 16 QAM | 16 QAM | NA | NA |
| 01000 | 2 | 16 QAM | 64 QAM | NA | NA |
| 01001 | 2 | 64 QAM | QPSK | NA | NA |
| 01010 | 2 | 64 QAM | 16 QAM | NA | NA |
| 01011 | 2 | 64 QAM | 64 QAM | NA | NA |
| 01100 | 3 | QPSK | QPSK | QPSK | NA |
| 01101 | 3 | QPSK | 16 QAM | 16 QAM | NA |
| 01110 | 3 | QPSK | 64 QAM | 64 QAM | NA |
| 01111 | 3 | 16 QAM | QPSK | QPSK | NA |
| 10000 | 3 | 16 QAM | 16 QAM | 16 QAM | NA |
| 10001 | 3 | 16 QAM | 64 QAM | 64 QAM | NA |
| 10010 | 3 | 64 QAM | QPSK | QPSK | NA |
| 10011 | 3 | 64 QAM | 16 QAM | 16 QAM | NA |
| 10100 | 3 | 64 QAM | 64 QAM | 64 QAM | NA |
| 10101 | 4 | QPSK | QPSK | QPSK | QPSK |
| 10110 | 4 | QPSK | 16 QAM | 16 QAM | QPSK |
| 10111 | 4 | QPSK | 64 QAM | 64 QAM | QPSK |
| 11000 | 4 | 16 QAM | QPSK | QPSK | 16 QAM |
| 11001 | 4 | 16 QAM | 16 QAM | 16 QAM | 16 QAM |
| 11010 | 4 | 16 QAM | 64 QAM | 64 QAM | 16 QAM |
| 11011 | 4 | 64 QAM | QPSK | QPSK | 64 QAM |
| 11100 | 4 | 64 QAM | 16 QAM | 16 QAM | 64 QAM |
| 11101 | 4 | 64 QAM | 64 QAM | 64 QAM | 64 QAM |
| 11110 | NA | NA | NA | NA | NA |
| 11111 | NA | NA | NA | NA | NA |

In the existing structure, out of the 32 possible modulation information patterns, two of them are currently unused. Thus, in one aspect, at least one of the unused patterns can be used to convey that there is a restriction on the feedback information, e.g., inform the UE about the codebook subset restriction. Table 2 illustrates an example of this proposal.

TABLE 2

Part 1 combinations for modulation and rank (proposal example)

| Bit pattern | RI | Modulation I | Modulation II | Modulation III | Modulation IV |
|---|---|---|---|---|---|
| 00000 | 1 | QPSK | NA | NA | NA |
| 00001 | 1 | 16 QAM | NA | NA | NA |
| 00010 | 1 | 64 QAM | NA | NA | NA |
| 00011 | 2 | QPSK | QPSK | NA | NA |
| 00100 | 2 | QPSK | 16 QAM | NA | NA |
| 00101 | 2 | QPSK | 64 QAM | NA | NA |
| 00110 | 2 | 16 QAM | QPSK | NA | NA |
| 00111 | 2 | 16 QAM | 16 QAM | NA | NA |
| 01000 | 2 | 16 QAM | 64 QAM | NA | NA |
| 01001 | 2 | 64 QAM | QPSK | NA | NA |
| 01010 | 2 | 64 QAM | 16 QAM | NA | NA |
| 01011 | 2 | 64 QAM | 64 QAM | NA | NA |
| 01100 | 3 | QPSK | QPSK | QPSK | NA |
| 01101 | 3 | QPSK | 16 QAM | 16 QAM | NA |
| 01110 | 3 | QPSK | 64 QAM | 64 QAM | NA |
| 01111 | 3 | 16 QAM | QPSK | QPSK | NA |
| 10000 | 3 | 16 QAM | 16 QAM | 16 QAM | NA |
| 10001 | 3 | 16 QAM | 64 QAM | 64 QAM | NA |
| 10010 | 3 | 64 QAM | QPSK | QPSK | NA |
| 10011 | 3 | 64 QAM | 16 QAM | 16 QAM | NA |
| 10100 | 3 | 64 QAM | 64 QAM | 64 QAM | NA |
| 10101 | 4 | QPSK | QPSK | QPSK | QPSK |
| 10110 | 4 | QPSK | 16 QAM | 16 QAM | QPSK |
| 10111 | 4 | QPSK | 64 QAM | 64 QAM | QPSK |
| 11000 | 4 | 16 QAM | QPSK | QPSK | 16 QAM |
| 11001 | 4 | 16 QAM | 16 QAM | 16 QAM | 16 QAM |
| 11010 | 4 | 16 QAM | 64 QAM | 64 QAM | 16 QAM |
| 11011 | 4 | 64 QAM | QPSK | QPSK | 64 QAM |
| 11100 | 4 | 64 QAM | 16 QAM | 16 QAM | 64 QAM |
| 11101 | 4 | 64 QAM | 64 QAM | 64 QAM | 64 QAM |
| 11110 | | codebookSubsetRestriction | | | |
| 11111 | NA | NA | NA | NA | NA |

In this example, when the Node B provides the bit pattern "11110" on the five bits corresponding to the modulation information of Part 1, this informs the UE that there is a restriction on the codebook for feedback purposes. While the example proposes to utilize currently unused modulation information bit patterns, this should not be taken to be limiting. If there are unused patterns corresponding to the CCS (channelization code set) or to the PCI, any of these unused patterns may be utilized.

Figure 3:
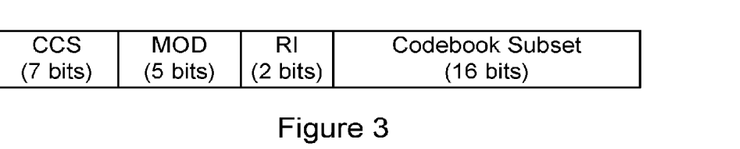
FIG. 3 illustrates an example structure that may be used to provide feedback restrictions.

Recall that in the case of the four branch MIMO, the codebook can contain 16 codebook elements per rank for a total of 64 elements. Then to implement the full codebookSubsetRestriction bitmap pattern for the four branch MIMO, a total of 64 bits are needed. However, the existing HS-SCCH does not contain 64 bits. Thus, in one aspect, the codebookSubsetRestriction can be implemented for each rank as illustrated in FIG. 3.

According to Table 2, the pattern "11110" in the modulation information bits can be used to indicate the codebook subset restriction, and the next 18 bits can be used indicates the specifics of the restriction. Among these, 2 bits can be used to indicate the rank and the remaining 16 bits can be used as a bitmap corresponding to the codebook elements of that particular rank.

Note that in this instance, the seven bits of the CCS are not necessarily used when the restriction pattern, e.g., "11110", is indicated. Thus, in an alternative, some or all of the CCS bits may be used to for the RI bits and/or the codebook element bitmap bits when the restriction pattern is indicated.

In another aspect, instead of implementing the codebookSubsetRestriction for each rank, it can be implemented for multiple ranks at a time. As indicated above, the existing HS-SCCH may not be sufficient to implement the full 64 bit codebookSubsetRestriction. However, it may have sufficient space to implement the codebookSubsetRestriction for two ranks. This is illustrated in FIG. 4.

Figure 4:
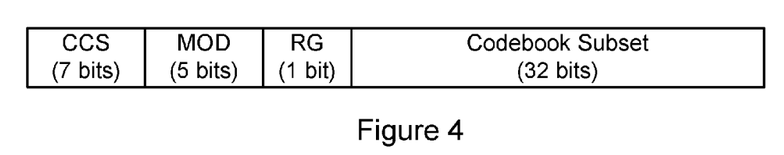
FIG. 4 illustrates another example structure that may be used to provide feedback restrictions.

In FIG. 4, 33 bits following the restriction pattern "11110" can be used to indicate the specifics. The RG (restriction grouping) field in this instance can be one bit followed by a 32-bit long bitmap field. An RG bit value of zero (or one) may indicate that the bitmap field corresponds to the elements of ranks 1 and 2 (or ranks 3 and 4).

Generally, when restriction is indicated (e.g., through the modulation information indicating the restriction pattern), sufficient number of bits should be provided to indicate the particular restriction grouping and for the bitmap corresponding to the codebook elements of the grouping. The RI field in FIG. 4 can be considered to be a particular form of restriction grouping.

While not shown, it is possible for the grouping to be smaller than the number of elements of a rank. For example, for the four branch MIMO, the RG field can be three bits long and the bitmap field can be eight bits long. In this instance, the RG field sequence "010" and "011" can indicate that the bitmap field respectively corresponds to the first and second eight codebook elements of rank 2. Such division can allow the Node B to finely control the granularity of the feedback information from the UE.

This can be advantageous in the following way. As indicated above, the bits of the CCS field are not necessarily used to indicate the channelization code set when the restriction pattern is indicated. In this instance, the seven bits of the CCS field and the four bits of the PCI field is sufficient to indicate the restriction grouping (three bits) and the bitmap (eight bits). In this way, the boundary between Part 1 and Part 2 can be maintained even when the restriction pattern is indicated.

Currently, HS-SCCH orders exist in HSPA as a fast L1/L2 control signaling to complement higher layer (e.g., RRC) signaling. By using a special format of the HS-SCCH, it is possible to convey orders to a UE without having to resort to the slower higher layer signaling. Currently there are orders specified for activation and deactivation or triggering of the following features:
- UE DTX (discontinuous transmission) activation/deactivation;
- UE DRX (discontinuous reception) activation/deactivation;
- HS-SCCH-less operation activation/deactivation;
- Enhanced serving cell change triggering;
- Secondary downlink carrier activation/deactivation in MC-HSDPA (multi-carrier HSDPA);
- Secondary uplink carrier activation/deactivation in DC-HSDPA (dual carrier HSDPA);
- Switching between UL transmit diversity activation states.

In an aspect, the Node B may provide information about the codebookSubsetRestriction using the HS-SCCH orders, e.g., for each rank, for multiple ranks, for parts of a rank, and so on.

Figure 5:
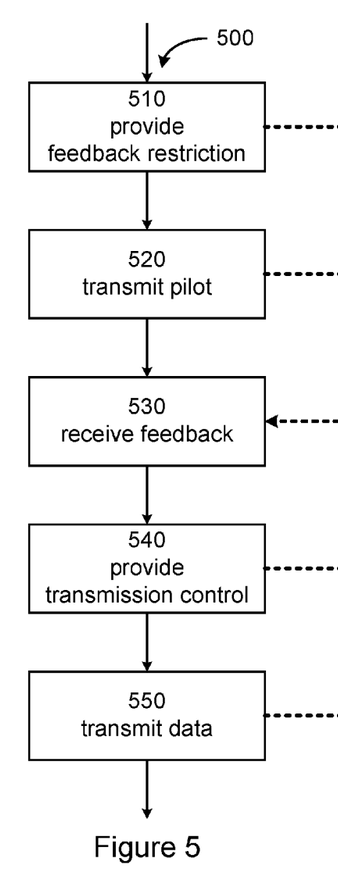
FIG. 5 illustrates a flow chart of an example method performed at a transmitting node to transmit data.
Figure 6:
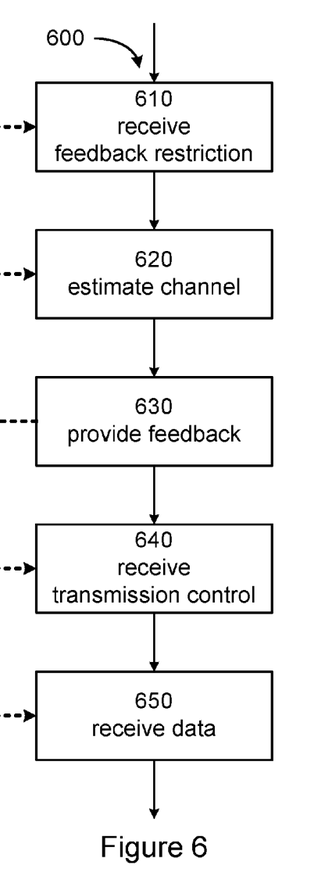
FIG. 6 illustrates a flow chart of an example method performed at a receiving node to receive data.

FIG. 5 illustrates a flow chart of an example method performed by a transmitting node 700 to provide transmission control information for transmission of data to a receiving node 900, and FIG. 6 illustrates a flow chart of an example method performed by the receiving node 900 to provide feedback to the transmitting node 700. Details of the steps will be described further below in conjunction with the descriptions of the transmitting and receiving nodes 700, 900.

For downlink transmission, the transmitting node 700 may be a network node and the receiving node 900 may be the wireless terminal. For example, step 510 may be performed by a Node B, or more generally, by a base station. However, this is merely an example. Any network node that provides services to the UEs (or generally "wireless terminals") may perform the step. Also, the network node need not directly communicate wirelessly with the UEs. For example, a network node such as RNC (radio network controller) that coordinates actions of one or more base stations may perform the step.

Figure 7:
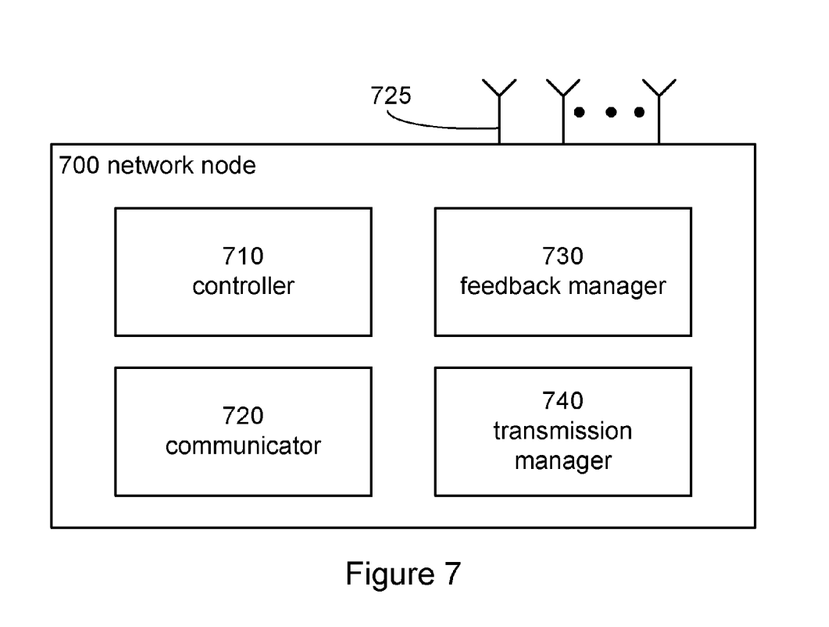
FIGS. 7 and 8 illustrate example embodiments of a transmitting node.

FIG. 7 illustrates an example embodiment of a transmitting node 700. The transmitting node 700 may include a controller 710, a communicator 720, a feedback manager 730, and a transmission manager 740. The communicator 720 may be structured to perform wired and/or wireless communication with other nodes and/or wireless terminals including the receiving node 800. The feedback manager 730 may be structured to determine feedback restriction information and provide the same to a wireless terminal 900 (e.g., UE) via the communicator 720. The feedback manager 730 may also be structured to receive feedback from the UE, e.g., via the communicator 720. The transmission manager 740 may be structured to determine transmission control information based on the feedback from the UE 900. The transmission manager 740 may also be structured to provide the transmission control information to the UE 900, e.g., via the communicator 720. The transmission manager 740 may further be structured to transmit data to the UE 900, via the communicator 720, consistent with the transmission control information. The controller 710 may be structured to control the overall operation of the transmitting node 700.

FIG. 7 provides a logical view of the transmitting node 700 and the devices included therein. Each device may be implemented as a circuit. That is, there may be a controlling circuit, a communicating circuit, a channel estimating circuit, and an encoding circuit. Also, any combination of the devices may be implemented in a single circuit. Further, any one device may be implemented as a combination of two or more circuits.

The transmitting node 700 can be implemented strictly in hardware. Alternatively, the transmitting node 700 may be implemented as a hardware/software combination. In this alternative, at least one device may implemented strictly in hardware or in a hardware and software combination. Each of the other devices may be purely software or a hardware and software combination such that on the whole, the transmitting node 700 is a hardware and software combination.

Figure 8:
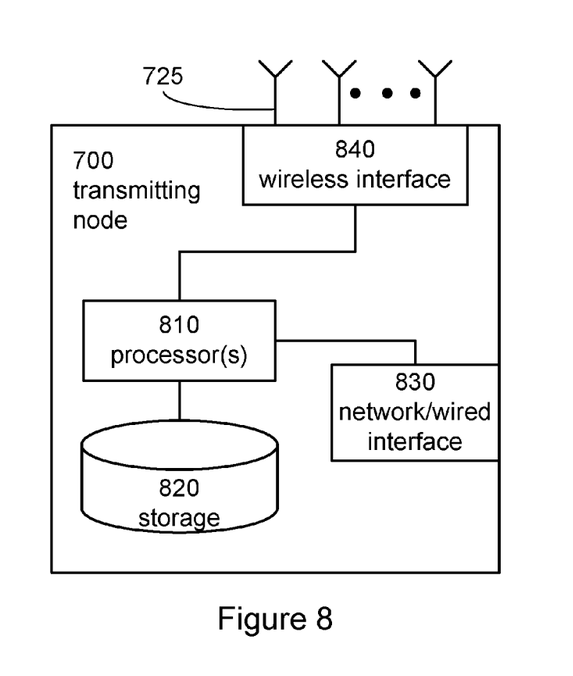

For example, as illustrated in FIG. 8, the transmitting node 700 may include one or more hardware processors 810, hardware storage (internal, external, or both) 820, and one or both of a hardware network interface 830 and a hardware wireless interface 840. The processor(s) 810 may be structured to execute program instructions to perform the functions of one or more of the network node devices. The instructions may be stored in a non-transitory storage medium or in firmware (e.g., ROM, RAM, Flash) (denoted as storage 820). Note that the program instructions may also be received through wired and/or wireless transitory medium via one or both of the network and wireless interfaces 830, 840. The network interface 830 may be structured to perform wired and/or wireless communications with other network nodes. The wireless interface (e.g., a transceiver) 840 may be structured to perform wireless communications with other radio nodes via one or more antennas 725.

Referring back to FIG. 5, the transmitting node 700 may perform the following steps to provide transmission control information to the receiving node 900. Transmission control information may specify one or more transmission characteristics that will be applied by the transmitting node 700 when the transmitting node 700 transmits data to the receiving node 900. In step 510, the feedback manager 730 may provide feedback restriction information to the receiving node 900. The feedback restriction information can specify restrictions on a feedback report to be provided from the receiving node.

In one aspect, the feedback restriction information may include one or more feedback restriction fields, and each corresponding feedback restriction value may specify restriction on one or more feedback parameters of the feedback report. For example, the feedback restriction information may include a precoding restriction field comprising one or more precode restriction bits. The bit pattern of the precoding restriction bits may make up the corresponding precoding restriction value. Each precode restriction bit may correspond to one of the plural precoding vectors. For each precoding restriction bit, a first bit value (0 or 1) may specify that reporting associated with the corresponding precoding vector is allowed, and a second bit value (other of 0 or 1)

may specify that reporting associated with the corresponding precoding vector is not allowed. The bit sequence $a_{63}, \ldots, a_3, a_2, a_1, a_0$ of the bitmap parameter in the codebookSubsetRestriction described may be an example of the precoding restriction field.

The feedback manager 730 may provide the feedback restriction fields to the receiving node 900 in step 510. In one aspect, the feedback manager 730 may use a higher layer signaling, such as RRC layer signaling to provide the feedback restriction fields. But in another aspect, the feedback manager 730 may provide the feedback restriction fields over a control channel. For fast responses, it is preferred that the control channel be a physical layer channel such as HS-SCCH.

In one aspect, a length of precoding restriction field may be sufficient to specify restrictions for all precoding vectors. For example, in the four branch MIMO, the bit sequence may be 64 bits long. But in another aspect, the length of the precoding restriction field can be less than the total number of precoding vectors.

When using the control channel to provide the feedback restriction information, it may be advantageous to have shorter lengths for one or more feedback restriction fields. This enables the feedback restrictions to be specified within the structure of the control channel such as the HS-SCCH.

In one embodiment, all feedback restriction fields may be provided in one subframe of the control channel. For example, recall that FIG. 3 illustrates a control channel subframe (e.g., HS-SCCH subframe). Also recall that the bit pattern "11110" in the 5 bits of MOD indicates that the HS-SCCH channel is carrying feedback restriction, and the next 18 bits carry the specifics of the restriction—namely, two bits for RI and 16 bits for the codebookSubsetRestriction. In the FIG. 3 example, the sum of lengths of all three fields—the MOD, RI and codebookSubsetRestriction—is less than the length of one HS-SCCH subframe. Thus, all three fields may be provided in one HS-SCCH subframe. Of course, providing the feedback restriction fields over more than one subframe is contemplated.

As indicated, the feedback report from the receiving node 900 typically includes a preferred rank and a preferred PCI. So that the reported The transmitting node 700 may wish to specify restrictions on these feedback parameters. Thus, the feedback restriction fields may include a rank restriction field in addition to the precoding restriction field. The corresponding rank restriction value carried in the rank restriction field may be one of a restricted rank value, a restricted rank group value, or a restricted rank subgroup value.

When the rank restriction value is a restricted rank value, it identifies an individual rank. For example, for the four branch MIMO, each of the four possible rank transmission can be individually identified with two bits. The restricted rank value may indicate that the precoding restriction field specifies restrictions on the precoding vectors of the identified rank. In other words, the restricted rank value may indicate that each precoding restriction bit of the precoding restriction field corresponds to one of the precoding vectors of the identified rank. As an illustration, in FIG. 3, when the two bits of the RI field (rank restriction field) is "00" (restricted rank value), this can indicate to the receiving node 900 that the each of the 16 bits of the codebookSubset field (precoding restriction field) corresponds to one of the precoder vectors of rank 1. Note that FIG. 3 is an example in which restrictions on feedback related to all precoder vectors (also referred to as precoder elements) of one rank can be specified in one control channel subframe.

When the rank restriction value is a restricted rank group value, it identifies a group of plural ranks. For example, for the four branch MIMO, the rank restriction field may be one bit long, and the bit value may be used to identify a lower rank group (ranks 1 and 2) or a higher rank group (ranks 3 and 4). The restricted rank group value may indicate that the precoding restriction field specifies restrictions on the precoding vectors of the identified ranks. In FIG. 4 for example, the RG bit value (restricted rank group value) determines whether the 32 bit long codebookSubset field corresponds to precoding vectors of ranks 1 and 2 or to precoding vectors of ranks 3 and 4. FIG. 4 is also an example in which restrictions on feedback related to all precoder elements of multiple ranks can be specified in one control channel subframe. The multiple ranks may or may not be all ranks.

When the rank restriction value is a restricted rank subgroup value, it not only identifies a rank, but also identifies a portion of that rank. For example, for the four branch MIMO, the rank restriction field may be three bits or longer. For example, a three bit rank restriction field can indicate that the precoding restriction field specifies restrictions on the first eight or second eight precoding vectors of the identified rank.

It is thus seen that the granularity of the feedback reporting can be finely tuned through the rank restriction field. It is also seen that the length of the rank restriction field may be inversely correlated with the length of the precoding restriction field.

In one embodiment, a specific value inserted in a specific portion of the control channel subframe may be used to alert the receiving node 900 that the feedback restriction information is being provided. In this embodiment, the feedback restriction fields may further include a feedback restriction indication field, which may be in addition to one or both of the rank restriction field and the precoding restriction field. When a valid feedback restriction indication value is carried in the feedback restriction indication field, it can indicate to the receiving node 900 that the control channel subframe is carrying the feedback restriction information. In FIGS. 3 and 4, the 5 bit long MOD field is an example of the feedback restriction indication field and the pattern "11110" is an example of a valid feedback restriction indication value. In these Figures, the MOD field occupies a 5 bit long portion of the HS-SCCH subframe starting from the $8^{th}$ bit position.

It can then be said that in an embodiment, the feedback manager 730 inserts the valid feedback restriction indication value into a specific portion of the control channel subframe as part of providing the feedback restriction fields in step 510. The receiving node 900 then can determine that the feedback restriction information is being provided based on the value carried in the specification portion of the subframe. The length of the feedback restriction indication field can be predetermined (e.g., 5 bits).

Alternatively, a control channel order (e.g., HS-SCCH order) may be used to notify the receiving node 900. That is, the feedback manager 730 may provide the feedback restriction information in the control channel order in step 510.

Referring back to FIG. 5, in step 520, the transmitting node 700 may transmit a reference signal for sounding purposes. For example, the transmitting node 700 may transmit pilot symbols on a pilot channel, such as on a CPICH. This enables the receiving node 900 to perform channel estimation.

In step 530, the feedback manager 730 may receive the feedback report from the receiving node 900. In one aspect, the feedback report may be received over a feedback channel (e.g., HS-DPCCH). The feedback report may include one or more feedback parameters. Each feedback parameter may indicate a channel characteristic of a wireless channel between the transmitting and the receiving nodes 700, 900 or may indicate a transmission characteristic preferred by the receiving node 900 of data transmission from the transmitting node 700 to the receiving node 900.

For example, the feedback parameters may include a rank parameter and a precoding parameter. The rank parameter may indicate a rank of data transmission preferred by the receiving node 900. Also, the precoding parameter may indicate a precoding vector preferred by the receiving node 900 to be applied to the data transmission from the transmitting node 700 to the receiving node 900. The preferred precoding vector may be one of one or more precoding vectors. In one aspect, the feedback restriction information provided to the receiving node 900 in step 510 may include restrictions on one or both of rank parameter values (e.g., through the rank restriction field) and precoding parameter values (e.g., through the precoding restriction field).

In step 540, the transmission manager 740 may provide the transmission control information to the receiving node 900 based on the feedback parameters. In one aspect, the transmission control information may include one or more transmission control fields. For each transmission control field, a corresponding transmission control value may specify a transmission characteristic that will be applied by the transmitting node in transmitting data to the receiving node. For example, the transmission control information may include a code channel set field, a modulation field, a rank field, a UE identity field, and so on. Generally, it can be said that the transmission control information may specify one or more transmission characteristics that will be applied by the transmitting node 700 in transmitting data to the receiving node 900.

In one embodiment, the transmission manager 740 may provide the transmission control fields to the receiving node 900 over a control channel, e.g., HS-SCCH, in step 540. In an embodiment, a recognized value inserted in a specific portion of the control channel subframe may be used to alert the receiving node 900 that the transmission control information is being provided. In this embodiment, the transmission control fields may include a transmission control indication field. When a valid transmission control indication value is carried in this field, it can indicate to the receiving node 900 that the control channel subframe is carrying the transmission control information. In FIGS. 3 and 4, the 5 bit long MOD field may also serve as the transmission control indication field and any of the patterns ranging between "00000" and "11101" may be recognized as being a valid transmission control indication value.

It can then be said that in an embodiment, the transmission manager 740 may insert the valid transmission control indication value into a specific portion of the control channel subframe as part of providing the transmission control fields in step 540. The receiving node 900 then can determine that the transmission control information is being provided based on the value carried in the specification portion of the subframe.

In FIGS. 3 and 4, it is seen that the MOD field serves double duty of sorts. A valid MOD value indicates that the HS-SCCH channel subframe is carrying the transmission control information. In addition, it also specifies transmission characteristics that will be applied when the transmitting node 700 transmitting data.

The control channel that the transmission manager 740 uses in step 540 to provide the transmission control information may be the same control channel used by the feedback manager 730 in step 510 to provide the feedback restriction information. Fore example, HS-SCCH may be used in both steps. In this instance, the same specific portion of the control channel subframe may be used in both steps. This implies that the feedback restriction indication field and the transmission control indication field are the same predetermined length and both occupy the same specific portion of the control channel subframe.

This also implies that the valid feedback restriction indication values and the valid transmission control indication values should not overlap. In FIGS. 3 and 4, the bit pattern "11110", which does not overlap with any of the valid MOD bit patterns (from "00000" to "11101"), is used to indicate presence of feedback restriction information. Of course, the pattern "11111" may also be used.

In general, there can be any number of valid feedback restriction indication values and also any number of valid transmission control indication values. Then to ensure that there is no overlap, it should be that a number of valid transmission control indication values (a number of valid feedback restriction indication values) should be less than a number of values that can be represented in the predetermined length. This makes it possible to ensure that the valid feedback restriction value is not any of the valid transmission control values and vice versa.

Referring back to FIG. 5, in step 550, the transmitting node 700 may transmit data to the receiving node 900 based on the transmission characteristics as specified in the transmission control information.

Figure 9:
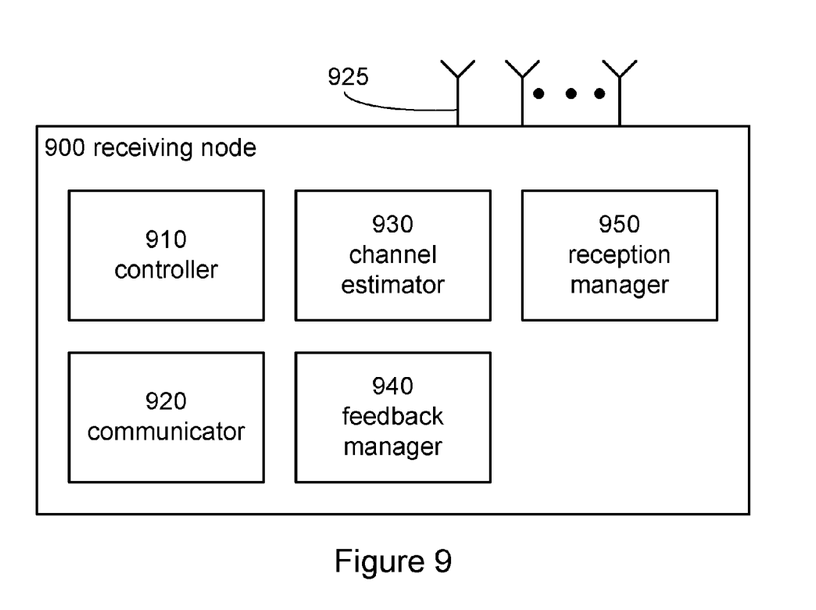
FIGS. 9 and 10 illustrate example embodiments of a receiving node.

FIG. 9 illustrates an example embodiment of a receiving node 900. The receiving node 900 may include a controller 910, a communicator 920, a channel estimator 930, a feedback manager 940 and a reception manager 950. The communicator 920 may be structured to perform wired and/or wireless communication with other nodes and/or wireless terminals. The channel estimator 930 may be structured to estimate a wireless communication channel based on sounding signals. The feedback manager 940 may be structured to provide a feedback report to a transmitting node 700, e.g., via the communicator 920. The reception manager 950 may be structured to receive transmission control information from the transmitting node 700 in preparation to receive data transmissions from the transmitting node 700. The controller 910 may be structured to control the overall operation of the receiving node 900.

FIG. 9 provides a logical view of the receiving node 900 and the devices included therein. Each device may be implemented as a circuit. That is, there may be a controlling circuit, a communicating circuit, a channel estimating circuit, and an encoding circuit. Also, any combination of the devices may be implemented in a single circuit. Further, any one device may be implemented as a combination of two or more circuits.

The receiving node 900 can be implemented strictly in hardware. Alternatively, the receiving node 900 may be implemented as a hardware/software combination. In this alternative, at least one device may implemented strictly in hardware or in a hardware and software combination. Each of the other devices may be purely software or a hardware and software combination such that on the whole, the receiving node 900 is a hardware and software combination.

Figure 10:
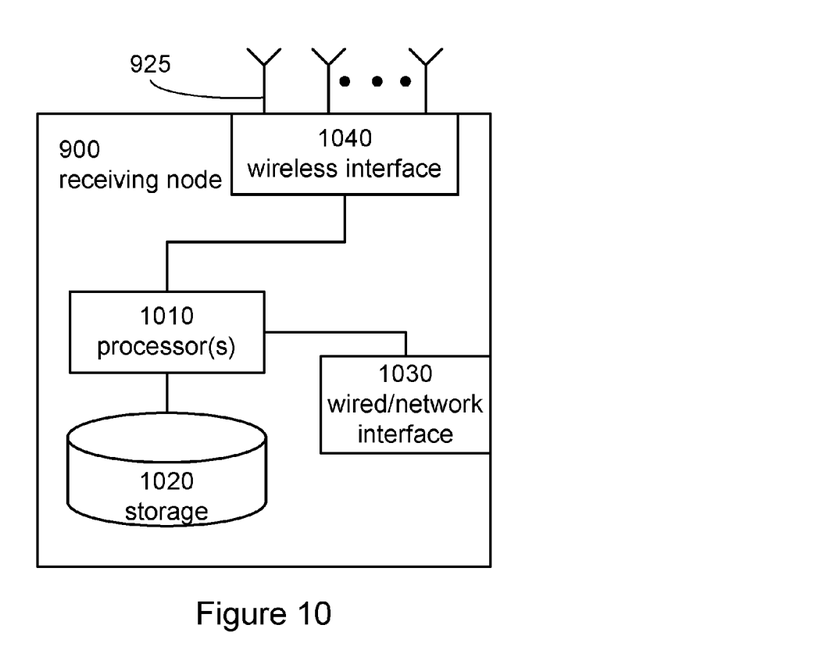

For example, as illustrated in FIG. 10, the receiving node 900 may include one or more hardware processors 1010, hardware storage (internal, external, or both) 1020, and one or both of a hardware network interface 1030 and a hardware wireless interface 1040. The processor(s) 1010 may be structured to execute program instructions to perform the functions of one or more of the network node devices. The instructions may be stored in a non-transitory storage medium or in firmware (e.g., ROM, RAM, Flash) (denoted as storage 1020). Note that the program instructions may also be received through wired and/or or wireless transitory medium via one or both of the network and wireless interfaces 1030, 1040. The network interface 1030 may be structured to perform wired and/or wireless communications with other network nodes. The wireless interface (e.g., a transceiver) 1040 may be structured to perform wireless communications with other radio nodes via one or more antennas 925.

The receiving node 900 may perform the method 600 illustrated in FIG. 6 to receive the data transmitted from the transmitting node 700. In step 610, the feedback manager 940 may receive the feedback restriction information from the transmitting node 900. The feedback restriction information may be received through RRC signaling, over a control channel, or through a control channel order. The details have been described, and thus will not be repeated for sake of brevity.

In step 620, the channel estimator 930 may estimate a channel state of a communication channel between the transmitting node 700 and the receiving node 900 based on a reference signal transmitted from the transmitting node 700.

In step 630, the feedback manager 940 may provide the feedback report, e.g., over a feedback channel, to the transmitting node 700 based on the estimated channel state and also based on the feedback restriction information. That is, the feedback report will be in compliance with the feedback restriction information. For example, when the feedback restriction information includes a rank restriction, the reported rank parameter value will comply with the rank restriction. When the feedback restriction information includes a precoding restriction, the reported precoding parameter value will comply with the precoding restriction.

In step 640, the reception manager 950 may receive transmission control parameters from the transmitting node 720. The transmission control parameters maybe received over a control channel. In one aspect, this may be the same control channel over which the feedback manager 940 received the feedback restriction information in step 610.

Recall that in the discussion regarding the transmitting node 700, the feedback restriction indication field (part of feedback restriction information) and the transmission control indication field (part of transmission control information) occupy the same specific portion of the control channel subframe. Thus, in one embodiment in which the transmitting node 700 uses the same control channel to provide the feedback restriction information and the transmission control information, the value carried in the specific portion of the control channel subframe will alert the receiving node 900 whether the control channel is carrying the feedback restriction information or the transmission control information.

Figure 11:
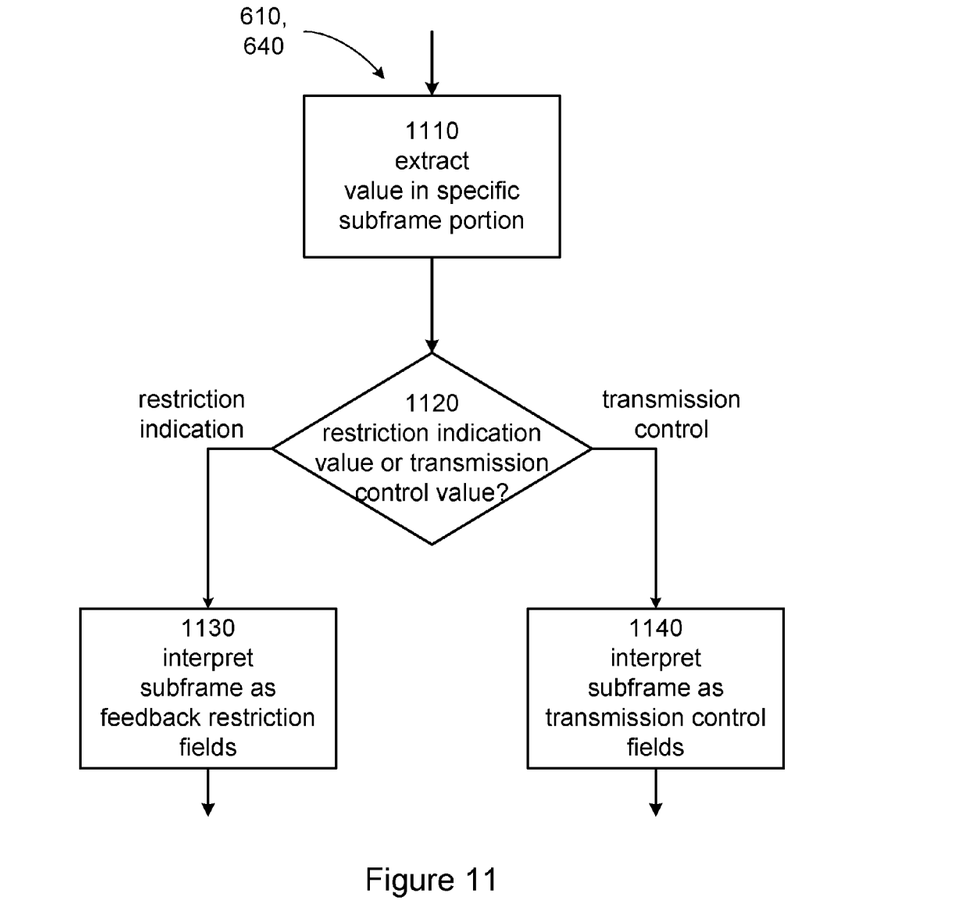
FIG. 11 is a flow chart of an example method performed by a receiving node to receive feedback restriction information and transmission control information.

FIG. 11 illustrates a flow chart of an example process performed by the receiving node 900 to implement steps 610 and 640. In step 1110, the receiving node 900, e.g., the controller 910, may extract the value carried in the specific portion of the subframe of the control channel received from the transmitting node 700. In step 1120, the controller 910 may determine whether the extracted value is a valid feedback restriction indication value or a valid transmission control indication value. In step 1130, the controller 910 may determine that the subframe is carrying the feedback restriction information when it is determined that the extracted value is the valid feedback restriction indication value. The feedback manager 940 may then proceed to receive the feedback restriction information. On the other hand, in step 1140, the controller 910 may determine that the subframe is carrying the transmission control information when it is determined that the extracted value is a valid transmission control indication value. The reception manager 950 may then proceed to receive the transmission control information.

Referring back to FIG. 6, in step 650, after configuring the communicator 920 for data reception based on the transmission control information, the reception manager 950 may receive the transmitted data from the transmitting node 700.

There are many advantages associated with one or more aspects of the disclosed subject matter. A non-exhaustive list of advantages include:

Provide flexibility at the network node to choose preferred precoding index, rank information, etc.;
Achieve better link adaptation;
Avoid full space search at the UE;
Minimize or eliminate feedback of non-useful information;
Minimize UE complexity;
Extend UE battery life.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a transmitting node of a wireless network to provide transmission control information to a receiving node, the method comprising:
    from the transmitting node, providing feedback restriction information to the receiving node over a control channel, the feedback restriction information specifying restrictions on a feedback report to be provided from the receiving node, the feedback restriction information comprising one or more feedback restriction fields, and a corresponding feedback restriction value specifying restrictions on one or more feedback parameters of the feedback report;
    at the transmitting node, receiving the feedback report from the receiving node, the feedback report comprising the one or more feedback parameters, each feedback parameter indicating a channel characteristic of a wireless channel between the transmitting node and the receiving node or indicating a transmission characteristic preferred by the receiving node of data transmission from the transmitting node to the receiving node; and
    from the transmitting node, providing the transmission control information to the receiving node based on the feedback parameters, the transmission control information specifying one or more transmission characteristics that will be applied by the transmitting node in transmitting data to the receiving node, wherein the transmission control information is provided to the receiving node over the same control channel used in providing the feedback restriction information.

2. The method of claim 1,
wherein the feedback restriction fields comprise a precoding restriction field, the precoding restriction field comprising one or more precoding restriction bits, a pattern of the precoding restriction bits making up a corresponding precoding restriction value, each precoding restriction bit corresponding to one of plural precoding vectors, and for each precoding restriction bit, first and second bit values respectively specify that feedback reporting associated with the precoding vector corresponding to that precoding restriction bit is and is not allowed, and
wherein the feedback restriction fields further comprise a rank restriction field, a corresponding rank restriction value being one of a restricted rank value, a restricted rank group value, or a restricted rank subgroup value, the restricted rank value identifying a rank and indicating that each precoding restriction bit of the precoding restriction field corresponds to one of the precoding vectors of the identified rank, the restricted rank group value identifying a group of plural ranks and indicating that each precoding restriction bit of the precoding restriction field corresponds to one of the precoding vectors of the identified group of plural ranks, and the restricted rank subgroup value identifying a rank and a portion of the identified rank and indicating that each precoding restriction bit of the precoding restriction field corresponds to one of the precoding vectors of the identified rank portion.

3. The method of claim 1, wherein the control channel is a physical layer control channel.

4. The method of claim 3, wherein providing the feedback restriction information comprises providing the feedback restriction fields in a control channel order.

5. The method of claim 1, wherein providing the feedback restriction information over the control channel comprises providing all feedback restriction fields in one control channel subframe.

6. The method of claim 5,
wherein the transmission control information comprises one or more transmission control fields, a corresponding transmission control value specifying a transmission characteristic that will be applied by the transmitting node in transmitting data to the receiving node.

7. The method of claim 6,
wherein the feedback restriction fields comprise a feedback restriction indication field of a predetermined length,
wherein providing the feedback restriction information to the receiving node comprises inserting a valid feedback restriction indication value into a specific portion of the control channel subframe, the valid feedback restriction indication value indicating that the control channel subframe is carrying the feedback restriction information,
wherein the transmission control fields comprise a transmission control indication field of the predetermined length,
wherein providing the transmission control information to the receiving node comprises inserting a valid transmission control indication value into the specific portion of the control channel subframe, the valid transmission control indication value indicating that the control channel subframe is carrying the transmission control information,
wherein a number of valid transmission control indication values is less than a number of values that can be represented in the predetermined length, and
wherein the valid feedback restriction indication value is not any of the valid transmission control indication values.

8. A transmitting node of a wireless network structured to provide transmission control information to a receiving node, the transmitting node comprising:
a feedback manager structured to:
provide feedback restriction information to the receiving node over a control channel, the feedback restriction information specifying restrictions on a feedback report from the receiving node, the feedback restriction information comprising one or more feedback restriction fields, and a corresponding feedback restriction value specifying restrictions on one or more feedback parameters of the feedback report, and
receive the feedback report from the receiving node, the feedback report comprising the one or more feedback parameters, each feedback parameter indicating a channel characteristic of a wireless channel between the transmitting node and the receiving node or indicating a transmission characteristic preferred by the receiving node of data transmission from the transmitting node to the receiving node; and
a transmission manager structured to provide the transmission control information to the receiving node based on the feedback parameters, the transmission control information specifying one or more transmission characteristics that will be applied by the transmitting node in transmitting data to the receiving node, wherein the transmission manager is structured to provide the transmission control information to the receiving node over the same control channel used by the feedback manager to provide the feedback restriction information.

9. The transmitting node of claim 8,
wherein the feedback restriction fields comprise a precoding restriction field, the precoding restriction field comprising one or more precoding restriction bits, a pattern of the precoding restriction bits making up a corresponding precoding restriction value, each precoding restriction bit corresponding to one of plural precoding vectors, and for each precoding restriction bit, first and second bit values respectively specify that feedback reporting associated with the precoding vector corresponding to that precoding restriction bit is and is not allowed, and
wherein the feedback restriction fields further comprise a rank restriction field, a corresponding rank restriction value being one of a restricted rank value, a restricted rank group value, or a restricted rank subgroup value, the restricted rank value identifying a rank and indicating that each precoding restriction bit of the precoding restriction field corresponds to one of the precoding vectors of the identified rank, the restricted rank group value identifying a group of plural ranks and indicating that each precoding restriction bit of the precoding restriction field corresponds to one of the precoding vectors of the identified group of plural ranks, and the restricted rank subgroup value identifying a rank and a portion of the identified rank and indicating that each precoding restriction bit of the precoding restriction field corresponds to one of the precoding vectors of the identified rank portion.

10. The transmitting node of claim 8, wherein the control channel is a physical layer control channel, and in order to provide the feedback restriction information to the receiving node, the feedback manager is structured to provide all feedback restriction fields of the feedback restriction information in one subframe of the control channel.

11. The transmitting node of claim 10,
wherein the transmission control information comprises one or more transmission control fields, a corresponding transmission control value specifying a transmission characteristic that will be applied by the transmitting node in transmitting data to the receiving node, and
wherein in order to provide the transmission control information to the receiving node, the transmission manager is structured to provide the transmission control fields to the receiving node.

12. The transmitting node of claim 11,
wherein the feedback restriction fields comprise a feedback restriction indication field of a predetermined length,
wherein in order to provide the feedback restriction fields to the receiving node, the feedback manager is structured to insert a valid feedback restriction indication value into a specific portion of the control channel subframe, the valid feedback restriction indication value indicating that the control channel subframe is carrying the feedback restriction information,
wherein the transmission control fields comprise a transmission control indication field of the predetermined length,
wherein in order to provide the transmission control fields to the receiving node, the transmission manager is structured to insert a valid transmission control indication value into the specific portion of the control channel subframe, the valid transmission control indication value indicating that the control channel subframe is carrying the transmission control information,
wherein a number of valid transmission control indication values is less than a number of values that can be represented in the predetermined length, and
wherein the valid feedback restriction indication value is not any of the valid transmission control indication values.

13. The transmitting node of claim 10, wherein in order to provide the feedback restriction information to the receiving node, the feedback manager is structured to provide the feedback restriction fields in a control channel order.

14. A method performed at a receiving node of a wireless network to provide a feedback report to a transmitting node, the method comprising:
at the receiving node, receiving feedback restriction information from the transmitting node over a control channel, the feedback restriction information specifying restrictions on the feedback report from the receiving node, the feedback restriction information comprising one or more feedback restriction fields, and a corresponding feedback restriction value specifying restrictions on one or more feedback parameters of the feedback report;
at the receiving node, estimating a channel state of a communication channel between the transmitting node and the receiving node based on a reference signal transmitted from the transmitting node;
from the receiving node, providing the feedback report to the transmitting node based on the estimated channel state and the feedback restriction information, the feedback report comprising the one or more feedback parameters, each feedback parameter indicating a channel characteristic of a wireless channel between the transmitting node and the receiving node or indicating a transmission characteristic preferred by the receiving node of data transmission from the transmitting node to the receiving node; and
at the receiving node, receiving transmission control information from the transmitting node, the transmission control information specifying one or more transmission characteristics that will be applied by the transmitting node in transmitting data to the receiving node, wherein the transmission control information is received from the transmitting node over the same control channel used in receiving the feedback restriction information,
wherein the feedback report complies with the restrictions specified in the feedback restriction information.

15. The method of claim 14,
wherein the feedback restriction fields comprise a precoding restriction field, the precoding restriction field comprising one or more precoding restriction bits, a pattern of the precoding restriction bits making up a corresponding precoding restriction value, each precoding restriction bit corresponding to one of plural precoding vectors, and for each precoding restriction bit, first and second bit values respectively specify that feedback reporting associated with the precoding vector corresponding to that precoding restriction bit is and is not allowed, and
wherein the feedback restriction fields further comprise a rank restriction field, a corresponding rank restriction value being one of a restricted rank value, a restricted rank group value, or a restricted rank subgroup value, the restricted rank value identifying a rank and indicating that each precoding restriction bit of the precoding restriction field corresponds to one of the precoding vectors of the identified rank, the restricted rank group value identifying a group of plural ranks and indicating that each precoding restriction bit of the precoding restriction field corresponds to one of the precoding vectors of the identified group of plural ranks, and the restricted rank subgroup value identifying a rank and a portion of the identified rank and indicating that each precoding restriction bit of the precoding restriction field corresponds to one of the precoding vectors of the identified rank portion.

16. The method of claim 14, wherein the control channel is a physical layer control channel.

17. The method of claim 16, wherein receiving the feedback restriction information from the transmitting node comprises receiving the feedback restriction information in a control channel order.

18. The method of claim 14, wherein receiving the feedback restriction information over the control channel comprises receiving all feedback restriction fields in one control channel subframe.

19. The method of claim 18,
wherein the transmission control information comprises one or more transmission control fields, a corresponding transmission control value specifying a transmission characteristic that will be applied by the transmitting node in transmitting data to the receiving node, wherein the transmission control fields comprise a transmission control indication field of a predetermined length, the transmission control indication field occupying a specific portion of the control channel subframe, a number of valid transmission control indication values being less than a number of values that can be represented in the predetermined length, wherein the feedback restriction fields comprise a feedback restriction indication field of the predetermined length, the feedback restriction indication field occupying a specific portion of the control channel subframe, a valid feedback restriction indication value being not equal to any of the valid transmission control indication values, and wherein receiving the feedback restriction information and receiving the transmission control information comprises:
  extracting a value carried in the specific portion of the subframe of the control channel received from the transmitting node;
  determining whether the extracted value is a valid feedback restriction indication value or a valid transmission control indication value;
  determining that the subframe is carrying the feedback restriction information when it is determined that the extracted value is the valid feedback restriction indication value; and
  determining that the subframe is carrying the transmission control information when it is determined that the extracted value is the valid first transmission control indication value.

20. A receiving node of a wireless network structured to provide a feedback report to a transmitting node, the receiving node comprising:
  a channel estimator structured to estimate a channel state of a communication channel between the transmitting node and the receiving node based on a reference signal transmitted from the transmitting node;
  a feedback manager structured to:
  receive feedback restriction information from the transmitting node over a control channel, the feedback restriction information specifying restrictions on the feedback report from the receiving node, the feedback restriction information comprising one or more feedback restriction fields, and a corresponding feedback restriction value specifying restrictions on one or more feedback parameters of the feedback report, and
  provide the feedback report to the transmitting node based on the estimated channel state and the feedback restriction information, the feedback report comprising the one or more feedback parameters, each feedback parameter indicating a channel characteristic of a wireless channel between the transmitting node and the receiving node or indicating a transmission characteristic preferred by the receiving node of data transmission from the transmitting node to the receiving node; and
  a reception manager structured to receive transmission control information from the transmitting node, the transmission control information specifying one or more transmission characteristics that will be applied by the transmitting node in transmitting data to the receiving node, wherein the reception manager is structured to receive the transmission control information from the transmitting node over the same control channel used by the feedback manager to receive the feedback restriction information, wherein the feedback report complies with the restrictions specified in the feedback restriction information.

21. The receiving node of claim 20,
wherein the feedback restriction fields comprise a precoding restriction field, the precoding restriction field comprising one or more precoding restriction bits, a pattern of the precoding restriction bits making up a corresponding precoding restriction value, each precoding restriction bit corresponding to one of plural precoding vectors, and for each precoding restriction bit, first and second bit values respectively specify that feedback reporting associated with the precoding vector corresponding to that precoding restriction bit is and is not allowed, and wherein the feedback restriction fields further comprise a rank restriction field, a corresponding rank restriction value being one of a restricted rank value, a restricted rank group value, or a restricted rank subgroup value, the restricted rank value identifying a rank and indicating that each precoding restriction bit of the precoding restriction field corresponds to one of the precoding vectors of the identified rank, the restricted rank group value identifying a group of plural ranks and indicating that each precoding restriction bit of the precoding restriction field corresponds to one of the precoding vectors of the identified group of plural ranks, and the restricted rank subgroup value identifying a rank and a portion of the identified rank and indicating that each precoding restriction bit of the precoding restriction field corresponds to one of the precoding vectors of the identified rank portion.

22. The receiving node of claim 20, wherein the control channel is a physical layer control channel, and in order to receive the feedback restriction information from the transmitting node, the feedback manager is structured to receive all feedback restriction fields of the feedback restriction information in one subframe of the control channel.

23. The receiving node of claim 22,
wherein the transmission control information comprises one or more transmission control fields, a corresponding transmission control value specifying a transmission characteristic that will be applied by the transmitting node in transmitting data to the receiving node, wherein the transmission control fields comprise a transmission control indication field of a predetermined length, the transmission control indication field occupying a specific portion of the control channel subframe, a number of valid transmission control indication values being less than a number of values that can be represented in the predetermined length, wherein the feedback restriction fields comprise a feedback restriction indication field of the predetermined length, the feedback restriction indication field occupying a specific portion of the control channel subframe, a valid feedback restriction indication value being not equal to any of the valid transmission control indication values, and wherein the receiving node further comprises a controller structured to:
extract a value carried in the specific portion of the subframe of the control channel received from the transmitting node,
determine whether the extracted value is a valid feedback restriction indication value or a valid transmission control indication value, determine that the subframe is carrying the feedback restriction information when it is determined that the extracted value is the valid feedback restriction indication value, and determine that the subframe is carrying the transmission control information when it is determined that the extracted value is the valid first transmission control indication value.

24. The receiving node of claim 22, wherein the feedback manager is structured to receive the feedback restriction information in a control channel order.

25. A non-transitory computer-readable medium comprising, stored thereupon, program instructions that, when executed by a computer of a transmitting node of a wireless network, causes the transmitting node to provide transmission control information to a receiving node by:

providing feedback restriction information to the receiving node over a control channel, the feedback restriction information specifying restrictions on a feedback report to be provided from the receiving node, the feedback restriction information comprising one or more feedback restriction fields, and a corresponding feedback restriction value specifying restrictions on one or more feedback parameters of the feedback report;

receiving the feedback report from the receiving node, the feedback report comprising the one or more feedback parameters, each feedback parameter indicating a channel characteristic of a wireless channel between the transmitting node and the receiving node or indicating a transmission characteristic preferred by the receiving node of data transmission from the transmitting node to the receiving node; and providing the transmission control information to the receiving node based on the feedback parameters, the transmission control information specifying one or more transmission characteristics that will be applied by the transmitting node in transmitting data to the receiving node, wherein the transmission control information is provided to the receiving node over the same control channel used in providing the feedback restriction information.

26. A non-transitory computer-readable medium comprising, stored thereupon, program instructions that, when executed by a computer of a receiving node, causes the receiving node to provide a feedback report to a transmitting node by:

receiving feedback restriction information from the transmitting node over a control channel, the feedback restriction information specifying restrictions on the feedback report from the receiving node, the feedback restriction information comprising one or more feedback restriction fields, and a corresponding feedback restriction value specifying restrictions on one or more feedback parameters of the feedback report;

estimating a channel state of a communication channel between the transmitting node and the receiving node based on a reference signal transmitted from the transmitting node;

providing the feedback report to the transmitting node based on the estimated channel state and the feedback restriction information, the feedback report comprising the one or more feedback parameters, each feedback parameter indicating a channel characteristic of a wireless channel between the transmitting node and the receiving node or indicating a transmission characteristic preferred by the receiving node of data transmission from the transmitting node to the receiving node; and receiving transmission control information from the transmitting node, the transmission control information specifying one or more transmission characteristics that will be applied by the transmitting node in transmitting data to the receiving node, wherein the transmission control information is received from the transmitting node over the same control channel used in receiving the feedback restriction information, wherein the feedback report complies with the restrictions specified in the feedback restriction information.

* * * * *